United States Patent [19]

Oskouy et al.

[11] Patent Number: 5,673,279
[45] Date of Patent: Sep. 30, 1997

[54] VERIFICATION OF NETWORK TRANSPORTER IN NETWORKING ENVIRONMENTS

[75] Inventors: Rasoul M. Oskouy; Sunderraj V. Palaniraj, both of Fremont; Andre J. Gaytan, Union City, all of Calif.

[73] Assignee: Sun Microsystems, Inc., Mountain View, Calif.

[21] Appl. No.: 554,609

[22] Filed: Nov. 6, 1995

[51] Int. Cl.$^6$ .................................. G06F 7/02; H04L 1/14
[52] U.S. Cl. .................. 371/67.1; 371/34; 371/20.4; 395/185.04
[58] Field of Search ...................... 395/183.19, 183.2, 395/185.03, 185.04, 185.09, 185.02; 371/67.1, 34, 30, 20.1, 20.4, 20.5, 68.2; 364/265.1, 266.4

[56] References Cited

U.S. PATENT DOCUMENTS

| | | | |
|---|---|---|---|
| 3,895,349 | 7/1975 | Robson | 371/27 |
| 3,995,258 | 11/1976 | Barlow | 371/34 |
| 4,108,359 | 8/1978 | Proto | 371/22.4 |
| 4,622,669 | 11/1986 | Pri-Tal | 395/183.19 |
| 5,142,538 | 8/1992 | Fickes et al | 371/34 |
| 5,251,204 | 10/1993 | Izawa et al. | 370/15 |
| 5,339,310 | 8/1994 | Taniguchi | 370/60 |
| 5,450,425 | 9/1995 | Gunn et al. | 371/67.1 |
| 5,485,470 | 1/1996 | Yamada | 371/20.4 |

FOREIGN PATENT DOCUMENTS 570 813 A2  11/1993  European Pat. Off. .

OTHER PUBLICATIONS

"Performance Evaluation Of Broadbank Connections And Services Under Varying Traffic Loads"; pp. 243–249? by Migotti et al., Electronic & Communication Journal 4 (1992), Aug., No. 4, London, GB.

Primary Examiner—Robert W. Beausoliel, Jr.
Assistant Examiner—Trinh L. Tu
Attorney, Agent, or Firm—Blakely Sokoloff Taylor & Zafman

[57] ABSTRACT

A method and an apparatus for verifying a network transporter under test which is able to perform the test and produce test results by posting test packets through network transporter without requiring large amounts of memory and producing results in a short period of time. The present invention utilizes one or more FIFO (First In First Out) buffers in which plurality of components of each packet is stored just as each packet is posted to the network transporter under test. As soon as the corresponding packet is received on the other side of the network transporter, plurality of components and the receive packet are compared and a test result is produced. As soon as such comparison is performed and completed and the test results are produced, the corresponding plurality of components stored in the FIFO is discarded and the corresponding memory space used is freed up for the next packet's test information.

21 Claims, 10 Drawing Sheets

HARDWARE SIMULATOR 214

TX PSEUDO FIFO DATA FORMAT 318

| FLAG[109] | NUMCELL [108:97] | AA15[96] | EOPPTICLP [95:92] | NEOPPTICLP [91:88] | VPI[87:80] | VCI[79:64] | CRC[63:32] | AA15_CTRL_LEN [31:0] |
|---|---|---|---|---|---|---|---|---|
| | | | | ENTRY 1 | | | | |
| | | | | ENTRY 2 | | | | |
| | | | | ENTRY 3 | | | | |
| | | | | ENTRY 4 | | | | |
| | | | | ......... | | | | |
| | | | | ......... | | | | |
| | | | | ENTRY 510 | | | | |
| | | | | ENTRY 511 | | | | |
| | | | | ENTRY 512 | | | | |

RX PSEUDO FIFO DATA FORMAT 314

| FLAG | AA15_CTRL_LENGTH [108:77] | PKTNUM [76:69] | EOP[68] | NUMCELL [67:56] | VPI_VCI[55:32] | CRC[31:0] |
|---|---|---|---|---|---|---|
| | | | | | ENTRY 1 | |
| | | | | | ENTRY 2 | |
| | | | | | ENTRY 3 | |
| | | | | | ENTRY 4 | |
| | | | | | ......... | |
| | | | | | ......... | |
| | | | | | ENTRY 4094 | |
| | | | | | ENTRY 4095 | |
| | | | | | ENTRY 4096 | |

*Figure 6*

VERIFICATION OF NETWORK TRANSPORTER IN NETWORKING ENVIRONMENTS

BACKGROUND OF THE INVENTION

(1) Field of the Invention

The method and apparatus of the present invention is related to the field of verification of a network transporter, e.g. an application specific integrated circuit under test. More specifically, the present invention is related to verification of a network transporter in networking environments.

(2) Description of Related Art

Traditionally, to verify a network transporter in networking applications, data in one form is applied at one end of a simulated network transporter and received at the other end in some other form. The received data is compared bit by bit with the transmitted data to verify the functionality of the network transporter under test. This typically requires data to be stored on each side of the network transporter and then compared after the entire simulation is completed.

The disadvantages of the traditional approach to the verification of a network transporter in networking applications is that, in order to run random tests, the test simulation must be run for a long period of time. Such testing generates large amounts of data files which need to be compared at the end of the simulation. Thus, the traditional approach requires a large amount of disk or other storage space. Additionally, the final results of the simulation may not be realized until the end of the simulation which may take two or three days or more.

FIG. 1 illustrates a simple example of verifying a network transporter under test network transporter 100 is the network transporter under test. At one end of network transporter 100, a packet is posted to network transporter 100. A packet is received at the other end of network transporter 100. When a packet is to be posted to network transporter 100, a file is generated, for example, file A 102 with data from the packet that is being posted. Once a packet is received at the other end of network transporter 100, a second file is typically generated, for example file B 104. At the end of the simulation, file A 102 and file B 104 are compared, the results of which represents whether the simulated network transporter 100 under test has any errors. For example, file A 102 and file B 104's contents may be compared to see whether they are identical. Thus, depending on the network transporter under test, once a packet is posted and a packet is received from the other side of the network transporter 100, the respective files generated must typically have identical data. If they do not, this may signify that there is an error in network transporter 100.

Typically, in a test situation, numerous packets are posted for testing a network transporter under test. Under a traditional approach, test results will not be apparent until all the packets have been posted and received and the respective files generated. Even if the first or the second packet signifies an error, the test results are not available until the completion of the simulation. As mentioned earlier, not only does this traditional approach consume a lot of time to produce test results, the traditional approach also consumes a large amount of memory space primarily in the files which must be generated and which are compared at the end of a simulation.

It is therefore desirable to have a method and an apparatus which is able to produce test results in a shorter period of time as compared to the traditional approach and is also able to perform the test and produce the test results without having to use as much memory as the traditional approach.

BRIEF SUMMARY OF THE INVENTION

A method and an apparatus for verifying a network transporter under test which is able to perform the test and produce test results by posting test packets through the network transporter without requiring large amounts of memory and producing results in a short period of time are disclosed.

The present invention utilizes one or more FIFO's (First-In First-Out buffer) in which test information of each packet is stored just as each packet is posted to the network transporter under test. As soon as the corresponding packet is received on the other side of the network transporter, test information and the receive packet are compared and a test result is produced. As soon as such comparison is performed and completed and the test results are produced, the corresponding test information stored in the FIFO is discarded and the corresponding memory space used is freed up for the next packet's test information.

Unlike traditional approaches which require saving of test information of each packet in for example, a file, until the completion of the simulation and therefore required use of large amounts of memory, the present invention's approach only requires saving of test information for packets which have just been posted. The present invention free's up the corresponding memory space storing the test information as soon as such test information is compared to the received packet on the other side of the network transporter.

The data for a packet which must be stored in the FIFO as part of the test information may include CRC (cyclic redundancy check) data. The CRC for data checking may be used from between system and media and use of pseudo-FIFO for control passing. Some packet may be received by the FIFO in portions (i.e. 2.1, 2.2, 2.3 for channel to information) in which case, each portion is automatically ordered in the correct ordering such that once 2.1 is retrieved, it may assume that 2.2 follows.

In network interface card implementations, the present invention removes the need for storing packets that a source sends to be checked against the packet that is received at the destination. The use of the present invention becomes more necessary when running long simulations which may run for days. Advantages of the present invention may also be applied to ATM (Asynchronous Transfer Method), FDDI (Fiber Distributed Data Interface), Ethernet Verification.

In an exemplary implementation, CRC may be applied to NIC (Network Interface Circuits), Verification or similar tasks in order to check data integrity in a simulation environment on data transfers between a host memory and a media interface. Another advantage to the present invention is that the data may be sent from either side (media or host memory) of the network transporter under test without performing data management to sort out which pattern belongs to which packet.

The method and apparatus of the present invention of verifying network transporter under test is therefore far superior than the traditional approach. The present invention is able not only to save the amount of memory space required during testing, but is able to save time required to obtain test results and therefore increase the speed of product turnaround time for testing of potential products. Further, because of the memory saving and time-saving advantages, the verification approach of the present invention sets a new standard and approach to testing of network transporters and

BRIEF DESCRIPTION OF THE DRAWINGS

FIG. 6 illustrates exemplary formats for TX pseudo FIFO 318 and RX pseudo FIFO 314.

DETAILED DESCRIPTION OF THE INVENTION

The present invention is a method and an apparatus for verifying a network transporter under test which reduces the amount of memory space and time utilized by traditional verification approaches.

Figure 1:
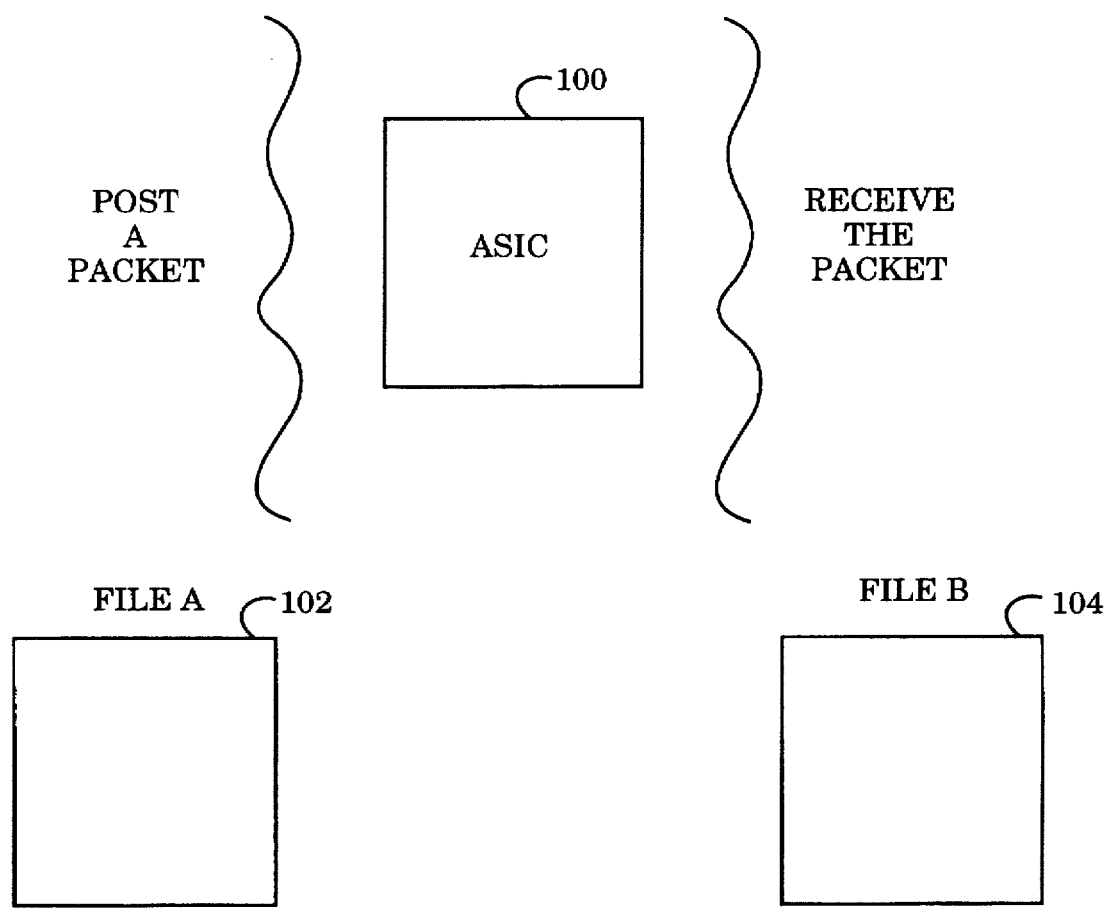
FIG. 1 illustrates a simple example of verifying a network transporter under test.
Figure 2:
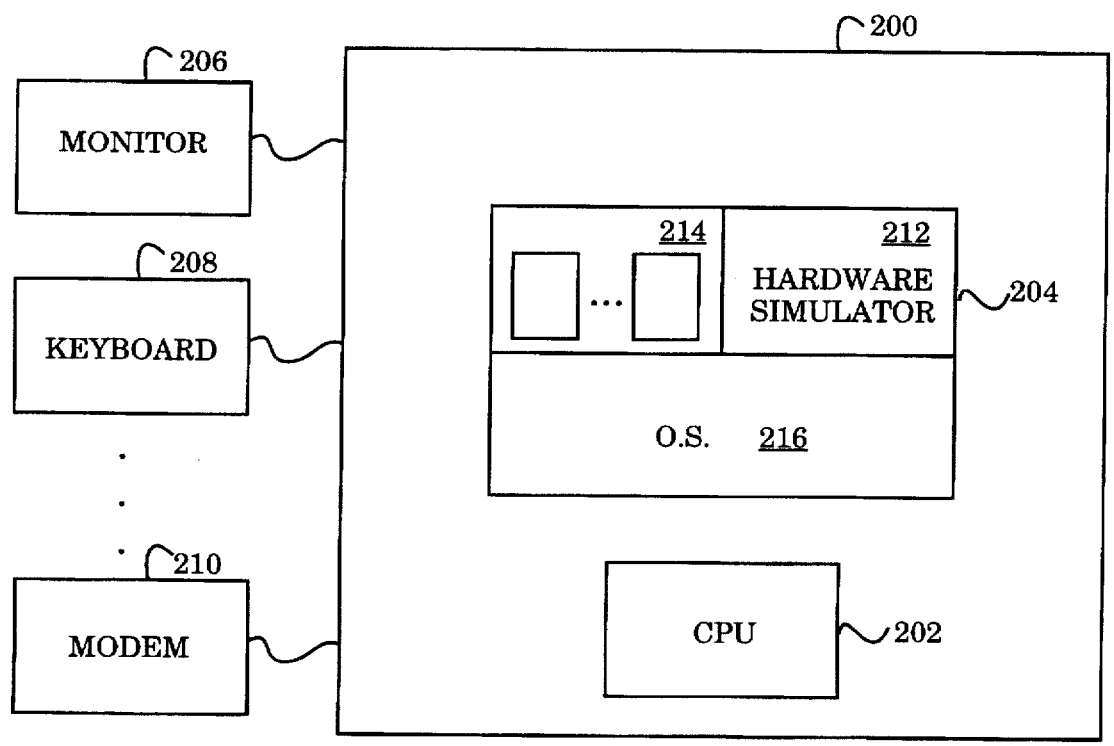
FIG. 2 is a block diagram illustrating an exemplary embodiment of the present invention as utilized on a computer.

FIG. 2 is a block diagram illustrating an exemplary embodiment of the present invention as utilized on a computer. Computer 200 has CPU 202 coupled to memory 204. Computer 200 may have various peripheral devices attached to it including monitor 206, keyboard 208 and modem 210. Hardware simulator 212 such as Verilog-HDL, may reside in memory 204 for the purposes of simulating for example hardware for testing. Hardware simulator 212 is capable of simulating different hardware components 214. Memory 204 also has operating system 216. With the present invention, testing of certain simulated hardware components 214 is performed faster with less memory consumption than traditional approaches.

Figure 3:
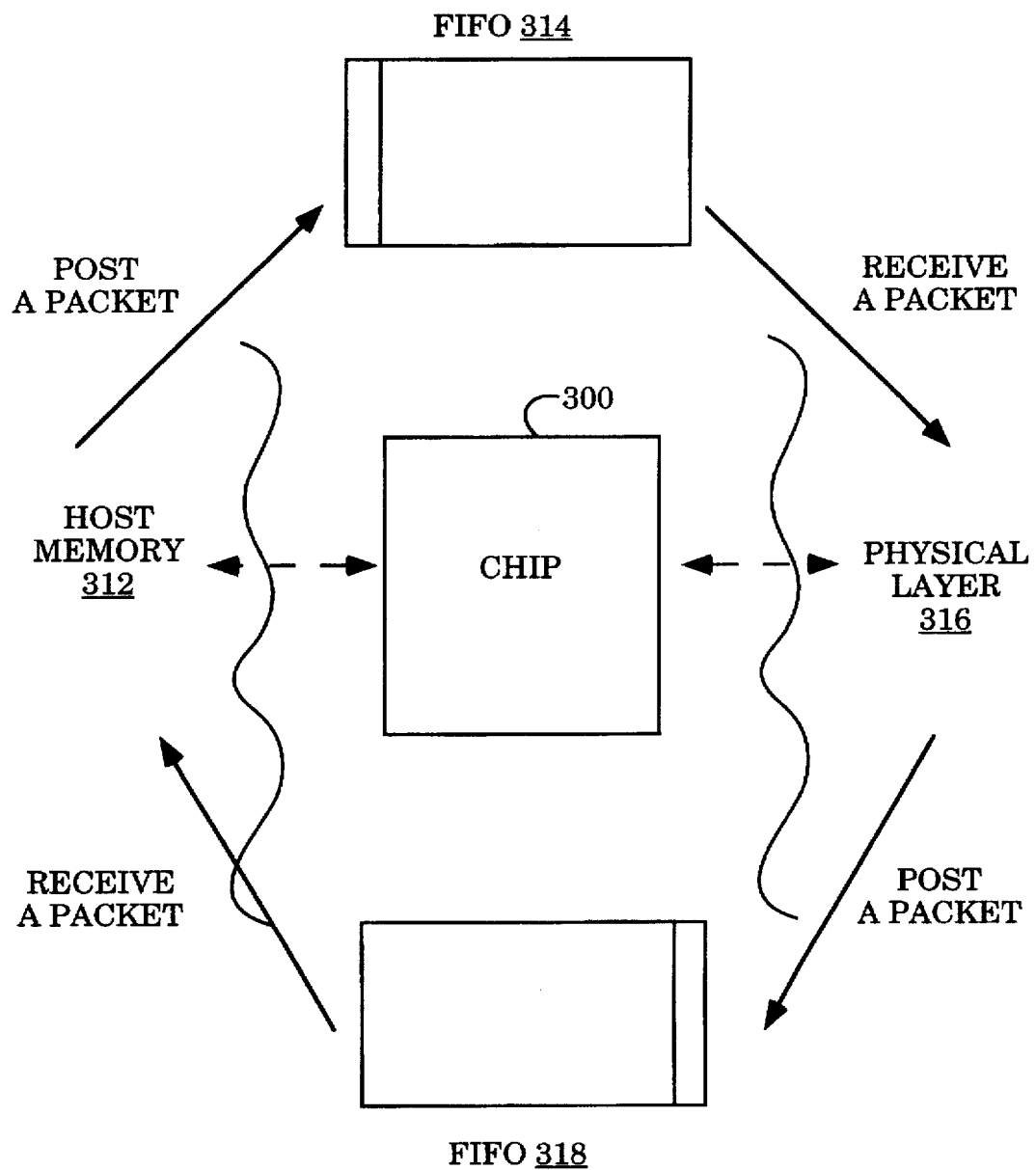
FIG. 3 illustrates an exemplary embodiment of the present invention.

FIG. 3 illustrates an exemplary embodiment of the present invention. In hardware simulation 214, simulated chip 300 is tested by a packet being transmitted by host memory 312. Such packet is processed in simulated chip 300 and passed onto simulated physical layer 316. The physical layer represents the actual physical medium used to transport the packet. When a packet is posted to simulator chip 300 by simulated host memory 312, unique information regarding the packet is saved in TX pseudo FIFO 314 at the same time. An exemplary content of such unique information of a given packet to be posted to a simulated chip 300 is illustrated in the description for FIG. 6. Once the packet is received on the simulated physical layer 316 side, the packet is compared to the unique information for the packet which was previously posted by host memory 312. If the information is identical, the test result is deemed a pass. Such test information (components) may either be outputted to the user immediately after such results are produced or at the end of the session.

The simulated FIFO 314 is referred herein as "pseudo" FIFO because unlike a regular FIFO which outputs data in the order that they were inputted, a walk through must be performed through the pseudo-FIFO in order to retrieve the correct packet information to be compared with packet information received from chip 300 to physical environment 316. Some packet may be received by the FIFO in portions (i.e. 2.1, 2.2, 2.3 for channel to information) in which case, each portion is automatically ordered in the correct ordering such that once 2.1 is retrieved, it may assume that 2.2 follows. A flag may be utilized for each packet of information inputted into the pseudo-FIFO to indicate whether or not the corresponding packet information has already been processed by the physical layer (i.e. already compared with packet information received from chip 300 to physical layer 316.) For example, a flag corresponding to a packet information which has already been processed may have a value of zero, whereas a flag corresponding to a packet of information which has not yet been processed may have a value of one. Thus, when a necessary packet of information is being retrieved from the pseudo-FIFO, the pseudo-FIFO is first walked through in the order that the packet of information is stored in the FIFO, and the flag for each packet of information is checked to see whether the corresponding packet of information has already been processed. If the corresponding packet information has not been processed, then that packet of information is checked to see if it is the packet of information that needs to be compared to the packet of information recently received from chip 300 by physical layer 316. This process is repeated as new packet of information is received by physical layer 316 by chip 300.

The process followed when the simulated physical layer sends a packet to a simulated host memory 312 is the same as when the packet is posted by the simulated host memory 312 to the simulated physical layer 316. Hence, when the simulated physical layer 316 sends a packet, a unique information for that packet is stored in RX pseudo-FIFO 318. Once the corresponding packet is received on the other side of chip 300 by simulated host memory 312, the corresponding unique information of the originally sent packet stored in RX pseudo-FIFO 318 by simulated physical layer 316 is compared to the receive packet on the simulated host memory 312 side. If they are identical, then the test result is a pass for this packet, otherwise the test result is a fail. Hardware simulator 212 creating hardware simulation 214, is illustrated as an exemplary tool in creating components illustrated herein.

Figure 4:
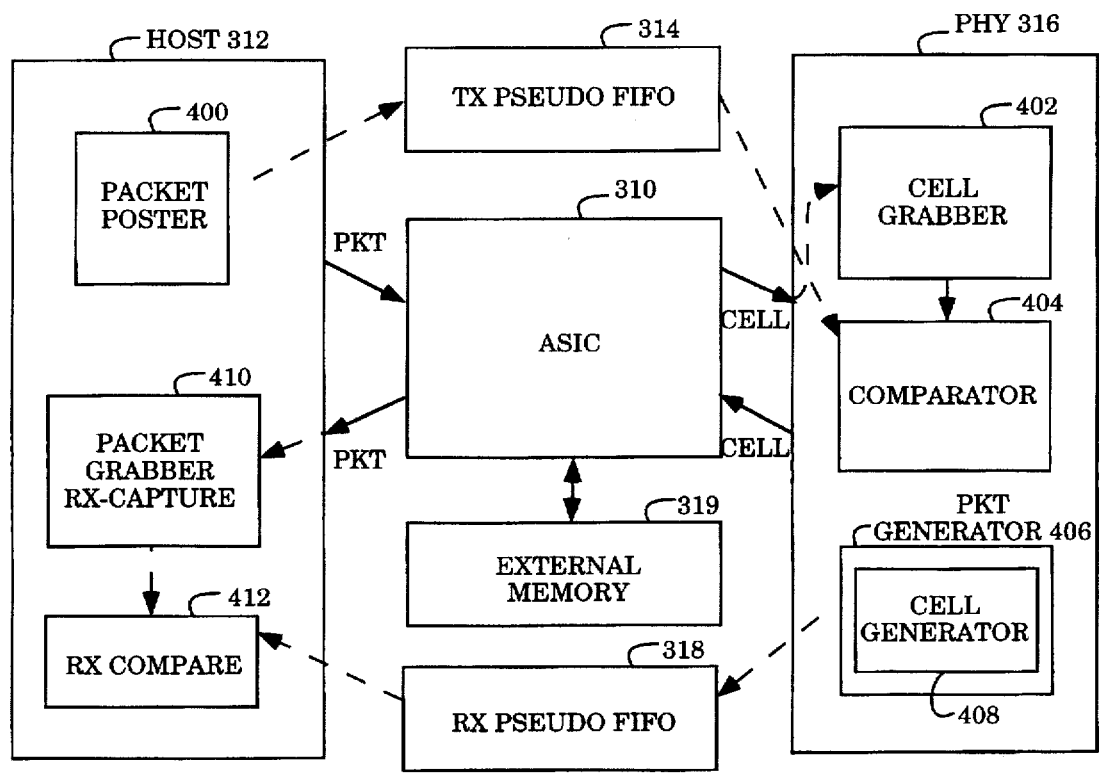
FIG. 4 illustrates a more detailed embodiment of the present invention.

FIG. 4 illustrates a more detailed embodiment of the present invention. All of the components illustrated herein are simulated hardware. In this exemplary embodiment, network transporter 310 is under test. A packet is posted by simulated host system 312 and at the same time the packet's unique information is stored in TX pseudo FIFO 314. The posting is performed by packet poster 400. Cell generator 408 is invoked through a Verilog task (or any other feasible hardware simulator) to generate cells to network transporter 310 through simulated physical environment 316. Packet grabber 410 helps in capturing data of SBus which is used in validating the RX packets. Once a packet is transmitted to simulated physical layer 316, it is grabbed by cell grabber 402. Cell grabber 402 collects all cells transmitted from the external memory buffer 319 and performs CRC calculations on the entire packet and then compares the CRC with the CRC placed in TX pseudo FIFO 318 and the CRC calculated by network transporter 310 for error checking. In an exemplary embodiment, network transporter 310 may be an SBus ATM host interface to a single chip designed to connect an ATM interface to the host memory through an SBus. The unique information for the cell is sent to comparator 404 from TX pseudo FIFO 314. Since TX pseudo-FIFO 314 is a "pseudo" FIFO as described earlier, in one embodiment of the present invention, a packet information grabber may be implemented on the simulated host memory 312 side as well as the simulated physical layer side 316. Such packet information grabber (not shown) walks through the appropriate pseudo-FIFO and grabs the packet of information corresponding to the packet information grabbed by cell grabber 402 or packet grabber 410. The packet information grabber forms this task by checking the flag for each packet of information in the pseudo-FIFO which indicates whether or not the corresponding packet of information has been processed by the receiving process (simulated host memory 312 or simulated physical layer 316). The packet information skips over any packet of information entry which has already been processed and grabs the appropriate unprocessed packet of information corresponding to the packet of information grabbed by cell grabber 402. Comparator 404 then compares the unique information with the corresponding information in the packet to determine whether or not the test result is a pass or a fail.

Packet generator 406 with cell generator 408 generates test information in the form of a packet transmitted to simulated host system 312. At the same time, unique information for the packet is stored in RX pseudo FIFO 318. Once the packet is transmitted to simulated host system 312 via network transporter 310, packet grabber 410 grabs the packet and sends it to RX compare 412. At the same time, the corresponding unique information is sent to RX compare 412 from RX pseudo FIFO 318. RX compare 412 performs a CRC comparison between the CRC of the packet received by simulated host memory 312 and the CRC placed in RX pseudo FIFO 318 for the packet and it is determined whether a network transporter 310 passes the test.

Figure 5:
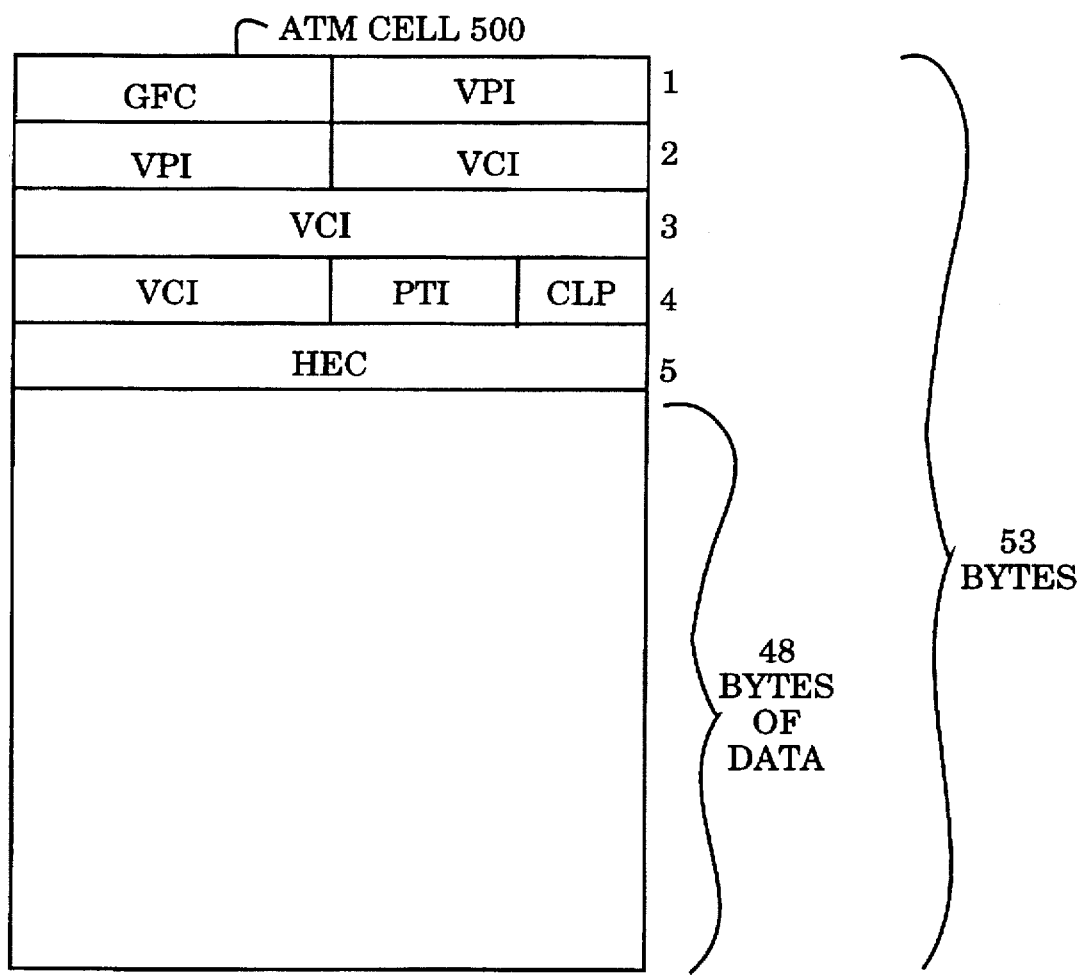
FIG. 5 illustrates an exemplary format for an exemplary cell.

FIG. 5 illustrates a typical format for an ATM exemplary cell. ATM cell 500 has various fields. This exemplary cell 500 has fifty-three bytes. The first byte has GFC (Generic Flow Control) and VPI (Virtual Path Indicator) fields. The second byte has VPI and VCI (Virtual Channel Identifier) fields. The third byte has VCI fields. The fourth byte has VCI, PTI (Payload Type Indicator) and CLP (Cell Loss Priority) fields. The fifth byte has HEC (Header Error Code) fields. The remainder of the cell consists of forty-eight bytes of data. These fields represent exemplary unique information which may be copied and saved in the FIFOs when the cell or corresponding packet is posted to the network transporter under test. The PTI field may be a three-bit field which defines whether the corresponding cell is a data cell or it is a RM (Resource Management) cell. The CLP field (Cell Loss Priority) may be a one-bit field used to prioritize a corresponding cell. A higher priority cell as indicated through the CLP field may be transmitted before any lower prioritized cells. The PTI field also indicates whether a data cell is the last cell (EOP) of the packet or not the last cell (NEOP) of the packet. The VPI indicates a particular virtual path of the given cells to be transmitted through. VCI indicates a packet's virtual channel in which the cells are to be transmitted. If the cell is corrupted, that cell is dropped. HEC is the error correcting code for bytes 1, 2, 3 and 4. Based on the HEC value it is possible to find out whether the header is corrupted or not.

FIG. 6 illustrates exemplary formats for TX pseudo FIFO 318 and RX pseudo FIFO 314. The FIFO data format may be as deep (i.e. may contain as many entries as corresponding to packets and cells) as they are data (cells or packets) to use for testing the network transporter. The fields correspond to the various fields described and mentioned in the description corresponding to FIG. 5 above. The data format for the pseudo-FIFOs illustrated herein is only for exemplary purposes and new fields may be added or deleted as necessary dependent on specific implementations of the present invention.

Figure 7:
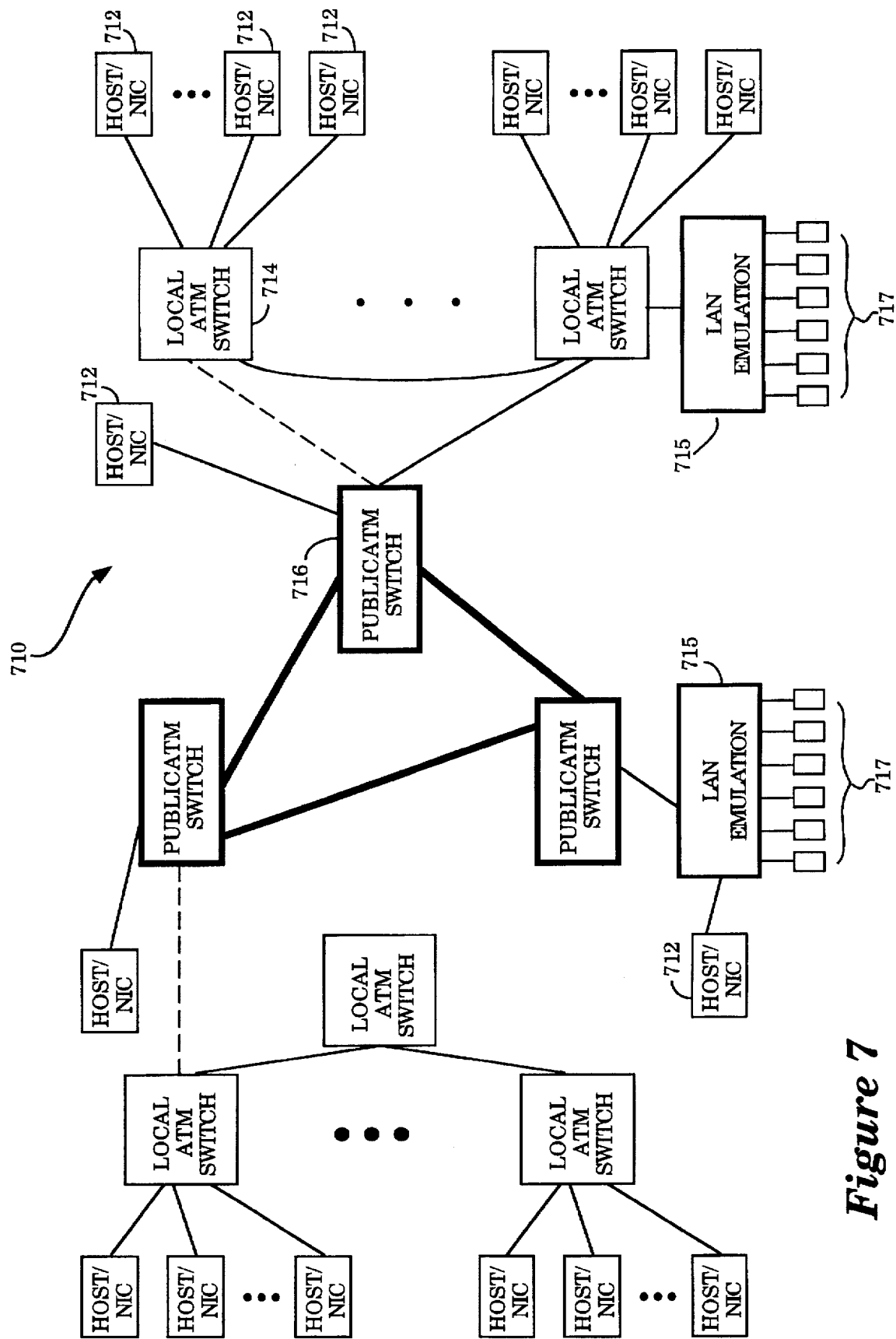
FIG. 7 illustrates a networking application for which the present invention may be used to verify a network transporter under test.

FIG. 7 illustrates a networking application for which the present invention may be used to verify a network transporter under test. The computer system network 710 includes host computer systems (not shown) which incorporate one or more of the ATM network interface circuits (NICs) 712. The NICs 712 are coupled to a public ATM switch 716 through a local ATM switch 714 to enable asynchronous transfer of data between host computer systems coupled to the network 710. Alternately, the NICs 712 can be coupled directly to the public ATM switch 716. As shown in FIG. 7, the computer system network 710 may also include computer systems which incorporate the use of a Local Area Network ("LAN") emulation 715 which serves as a gateway for connecting other networks such as Ethernet or token ring networks 717 which utilize the ATM network as a supporting framework. The NIC may be tested using the present invention's method and apparatus of verifying a network transporter under test.

Figure 8:
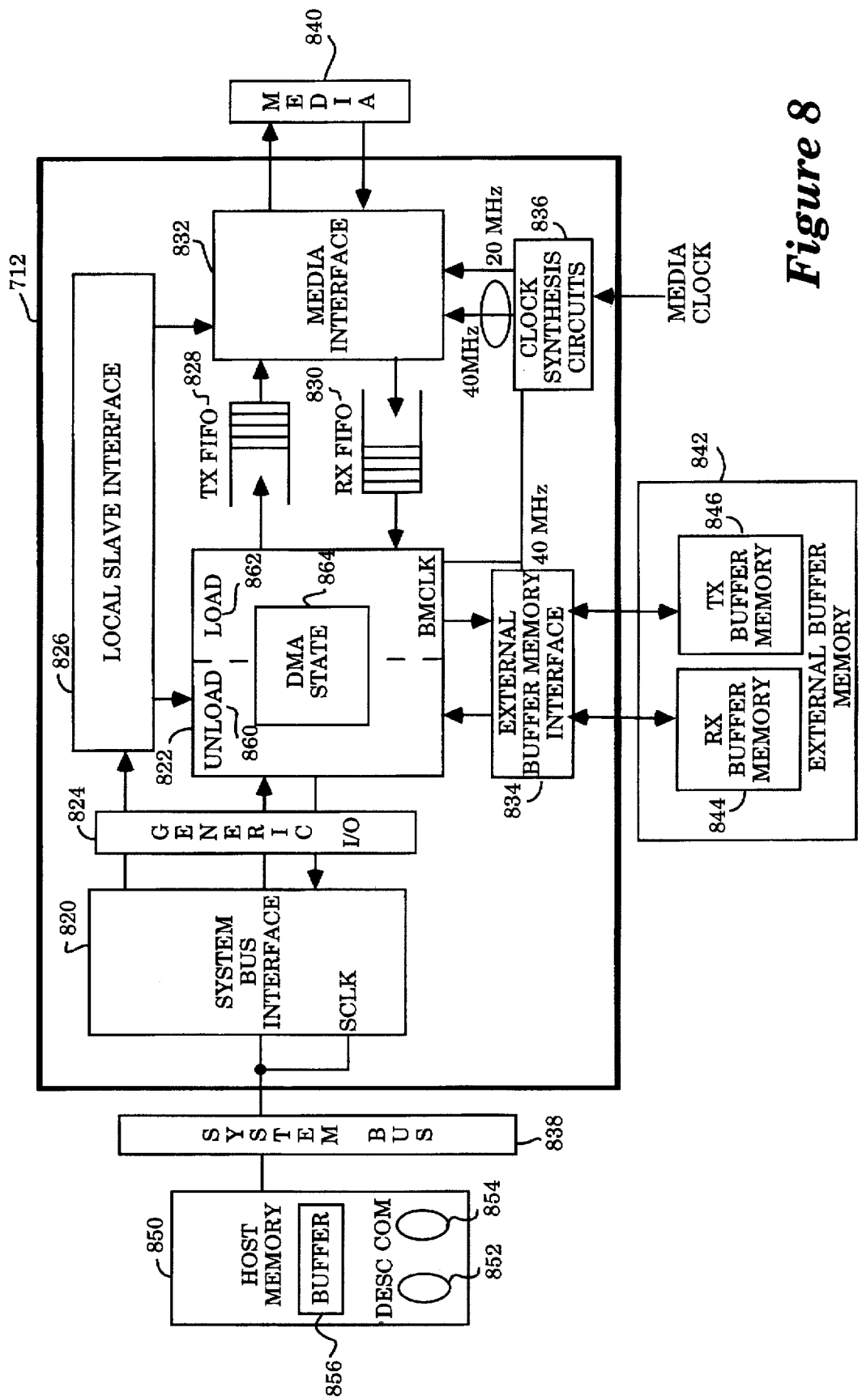
FIG. 8 illustrates an exemplary chip which may be simulated and for which the present invention's approach for verifying a network transporter under test may be applied before such chip is actualized into real hardware.

FIG. 8 illustrates an exemplary chip which may be simulated and for which the present invention's approach for verifying a network transporter under test may be applied before such chip is actualized into real hardware. The ATM NIC 712 interfaces the host computer system coupled through system bus 838 to the network media 840 operating in accordance with the ATM protocol.

The ATM NIC 712 shown includes a System Bus interface 820, a Generic Input/Output ("GIO") interface 824, a System and ATM Layer Core 822, a Local Slave interface 826, an array of transmit (TX) FIFOS 828, an array of receive (RX) FIFOS 830, a Media interface 832, an External Buffer Memory Interface 834 and clock synthesis circuit 836.

Together, the elements 820–836 of network interface circuit 712 cooperate to asynchronously transfer data between the host computer and the other computers in the network through multiple, dynamically allocated channels in multiple bandwidth groups. Collectively, the elements of the network interface circuit 712 function as a multi-channel intelligent direct memory access (DMA) controller coupled to the System Bus 838 of the host computer system. In a preferred embodiment, multiple transmit and receive channels are serviced as virtual connections utilizing a full duplex 155/622 Mbps physical link. Multiple packets of data, subscribed to different channels over the System Bus 838 to the external buffer memory 842, via the External Buffer Memory Interface 834, are segmented by the System and ATM Layer Core 822 into transmit cells for transmission to the Media 840 through Media interface 832.

The Core 822 also comprises reassembly logic to facilitate reassembly of the receive packets. The TX and RX FIFOS 828, 830, coupled between the Core 822 and the Media Interface 832, are used to stage the transmit and receive cell payloads of the transmit and receive packets respectively. The Media Interface 832 transmits and receives cells to the Media 840 of the network, driven by clock signals provided by Clock Synthesis Circuit 836. Preferably the Media, and therefore the Media interface 832, conforms to the Universal Test and Operations Physical Interface for ATM ("UTOPIA") standard, as provided by the ATM Forum Ad Hoc specification. To conform to the UTOPIA specification, the clock synthesis circuit 836 provides either a clock signal of 20 MHz or 40 MHz to enable the Media interface 832 to support a byte stream at 20 MHz for 155 Mbps or a 16 bit stream at 40 MHz for a 622 Mbps data stream.

In the present embodiment, the Media Interface 832 receives 52-byte data cells each having a 4-byte cell header and a 48-byte payload from the TX FIFO 828. The Media Interface 832 inserts a checksum as a fifth byte to the cell header into each cell prior to providing the 53-byte data cell to the Media 840. Conversely, when the Media Interface 832 receives cells from the Media 840, it examines the checksum in the fifth byte of each cell to determine if the checksum is correct. If so, the byte representing the checksum is stripped from the cell and the cell is forwarded to the RX FIFO 830. Otherwise, the entire cell is dropped.

The network interface circuit 712 also shields the cell delineation details of asynchronous transfer from the applications running on the host computer system. For present purposes, it is assumed that applications running on the host computer system manage transmit and receive data using wrap around transmit and receive rings with packet interfaces. However, the present invention may be practiced with the applications running on the host computer system managing transmit and receive data using other data structures.

The System Bus Interface 820 and Generic I/O interface 824 insulate the host computer system from the specifics of the transfer to the Media 840. Furthermore, the Core 822 is insulated from the specifics of the system bus 838 and host data structure. In the presently preferred embodiment, the System Bus is an S-Bus, as specified in the Institute of Electronics and Electrical Engineers ("IEEE") standard 1496 specification. The System Bus Interface 820 is configured to communicate in accordance with the specifications of the system bus, in the present illustration, the S-Bus.

It is contemplated that the System Bus Interface 820 can be configured to conform to different host computer system busses. The System Bus Interface 820 is also configured to transfer and receive data in accordance with the protocols specified by the Generic I/O interface 824. The Generic I/O interface 824 provides a singular interface through which the Core 822 communicates with the host computer. Thus, the Core 822 does not change for different embodiments of the NIC 712 which interface to different host computer systems and busses.

Host memory 850 with descriptor ring 852 and completion ring 854 is coupled to system bus 838. Host memory 850 may receive packets from media 840 through NIC 712. Once the packet is in host memory 850, the software acknowledges the received packet and reads from descriptor ring 852. Once the software has the DMA state, it begins moving the data in the packet into buffer 856 and places the DMA state back on completion ring 854.

Figure 9:
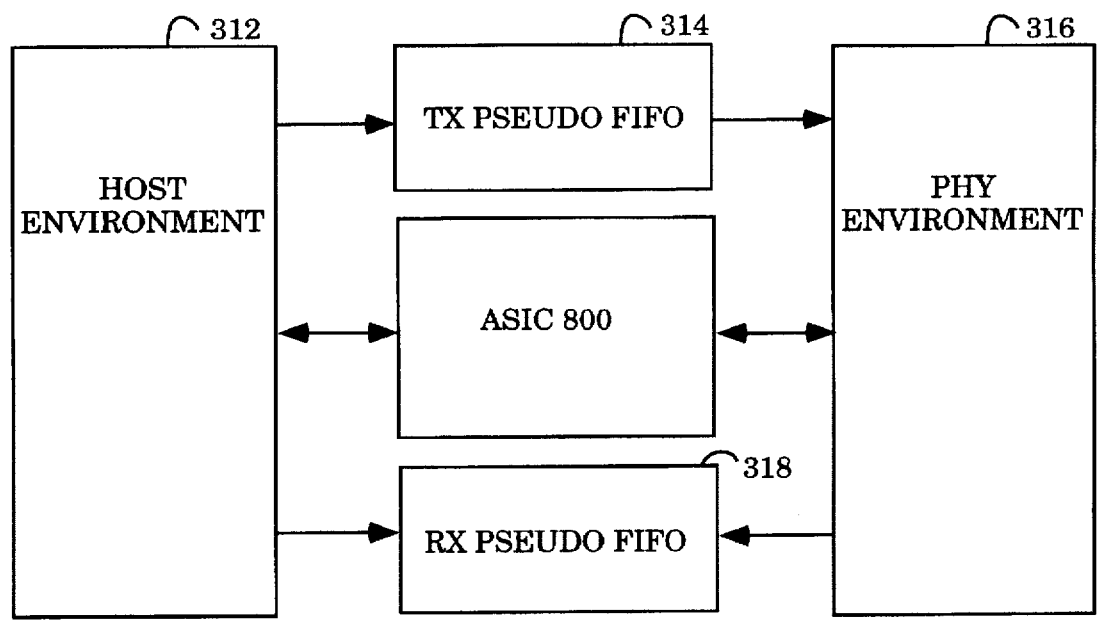
FIG. 9 illustrates an embodiment of the present invention implemented for testing the network transporter illustrated in FIG. 8.

FIG. 9 illustrates an embodiment of the present invention implemented for testing the network transporter illustrated in FIG. 8. The NIC is an SBus based network transporter which implements ATM SAR (Segmentation and Reassembly) functionality. It can support both thirty-two and sixty-four bit mode and up to sixty-four byte bursts. network transporter 800 is divided up into three blocks, namely input/output (IO), Transmit (TX) and Receive (RX). Transmit and Receive blocks together perform ATM SAR functions. The network transporter is the heart of an SBus HM (Host Memory) interface card.

The host environment and the physical environment communicates only through the network transporter 800, TX pseudo FIFO 314 and RX pseudo FIFO 318. For transmit operations, the host environment posts a packet to network transporter 800 and sends one entry into TX pseudo FIFO 314. As cells get out of the physical environment, the physical environment arranges the cells to form packets. Once a packet is formed, the physical environment removes the appropriate entry from TX pseudo FIFO 314 in order to verify the packet. The same is true for RX pseudo FIFO 318 except for it is performed in the other direction.

TX pseudo FIFO may be implemented as a FIFO 110 bits wide and 512 entries deep. The RX pseudo FIFO 318 may be implemented as a FIFO 109 bits and 4,096 entries deep. The number of fields of the FIFO depends on the information which needs to be communicated from one end of the network transporter to the other end. The depth of the FIFO depends on the number of packets which may be queued on the host environment side (TX pseudo FIFO) and on the physical environment side (RX pseudo FIFO). One of the advantages of this approach is the use of CRC checking. When a packet which has to be transmitted is posted by the host environment, CRC along with other header information for that particular packet is written into TX pseudo FIFO 314. The physical environment side retrieves this CRC and other information, and compares the information with the information from the packet sent through network transporter 800 to validate the data integrity. The approach avoids storing data on both sides and comparing them individually which would require a vast amount of memory and would take a long period of time to complete simulation and produce final results.

Figure 10:
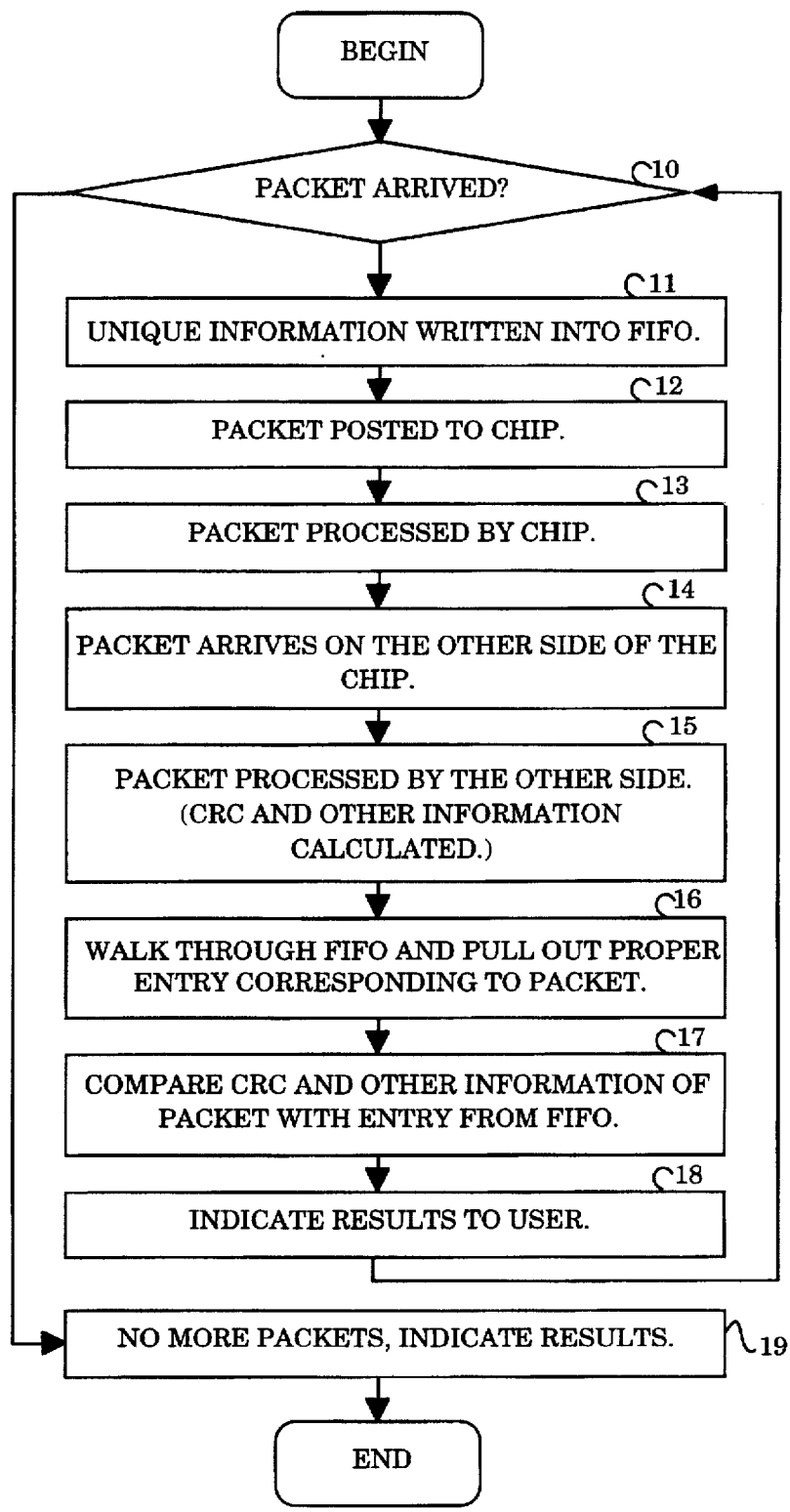
FIG. 10 is a flow diagram illustrating the general steps which may be followed by an exemplary embodiment of the present invention.

FIG. 10 is a flow diagram illustrating the general steps which may be followed by an exemplary embodiment of the present invention. In step 10, a packet arrives from physical environment or the host memory. The packet's unique information including CRC and other information is written into the appropriate FIFO in step 11. In step 12, the packet is posted to the chip. In step 13, the packet is processed by the chip under test. In step 14, the packet arrives on the other side of the chip (to the host memory environment or the physical environment). In step 15, the packet is then processed by the other side and the CRC and other information of the packet is calculated. In step 16, the proper entry is retrieved out from the proper FIFO. In step 17, the CRC and other information for the packet is compared with the appropriate packet information from the FIFO. In step 18, a comparison of results is indicated to the user. The steps are repeated until there are no more packets, i.e. no more test data, and the final results are indicated to the user in step 19.

What has been described is a method and an apparatus for verifying a network transporter under test. Test packets to be processed by the simulated network transporter under test are passed between a simulated host system and a simulated physical environment. At the same time as a packet is posted with the simulated network transporter, unique information corresponding to that packet is written into a pseudo FIFO which hold the unique information until the packet is output by the network transporter. Once the simulated network transporter completes processing the packet and outputs the packet to the other side of the simulated network transporter, the packet's CRC and other information is calculated and compared to the corresponding entry in the FIFO. If the information for the packet and the entry in the FIFO are identical, then the network transporter under test has passed the test for the particular packet, otherwise an error message may be output to the user.

Once the result for the packet is produced, the corresponding entry in the FIFO is discarded and the memory space occupied by the entry is freed up for future use. Because memory space is freed up each time a packet's information has been compared and a test result for that packet has been obtained, the present invention's approach does not require the use of huge amounts of memory space as do traditional approaches. Additionally, because test results for each packet may be available to the tester/user upon testing of each packet, a user may be able respond to any error data immediately after a packet has been processed through the simulated network transporter. Thus unlike traditional approaches which do not provide test results to a user until the end of the simulation, the approach of the present invention allows a faster method and apparatus for providing test results to the user.

While certain exemplary embodiments have been described in detail and shown in the accompanying drawings, it is to be understood that such embodiments are merely illustrative of and not restrictive on the broad invention, and that this invention is not to be limited to the specific arrangements and constructions shown and described, since various other modifications may occur to those with ordinary skill in the art.

What is claimed:

1. A method for verifying a software simulated network transporter under test comprising the steps of:
   saving a copy of a first set of components of a data packet in a pseudo first-in first-out buffer, said first set of components being unique and descriptive of said data packet;
   sending said data packet having said first set of components, to said network transporter, said first set of components being in an order having an original sequence, said step of sending being performed concurrently with said step of saving;
   receiving from said network transporter a second set of components from said network transporter, each of said second set of components having a corresponding component in said first set of components;
   reordering said first set of components in said pseudo-first-in first-out buffer to correspond with the order in which each said second set of components is received if any said second set of components is received from the network transporter in an order different from said original sequence; and
   comparing each said reordered first set of components with a corresponding said second set of components of said data packet as each said second set of components is received to determine if each said second set of components match each said reordered first set of components.

2. The method of claim 1 wherein said step of comparing further comprises the steps of:
   processing said data packet, said processing being performed by said network transporter to which said data packet is posted;
   outputting said data packet after said data packet is processed by said network transporter, said data packet outputted by said network transporter; and
   retrieving said corresponding second set of components from said data packet for comparison with said first set of components for said data packet.

3. The method of claim 2 wherein said step of retrieving further comprises the steps of:
   retrieving said first set of components corresponding to said data packet from said pseudo first-in first-out buffer; and
   calculating said corresponding second set of components for said data packet.

4. The method of claim 2 further comprising the step of indicating test results to a user.

5. The method of claim 4 further comprising the step of determining a pass result if said first set of components and said second set of components are equal.

6. An apparatus for verifying a software simulated network transporter under test for transporting data between a host side and a physical side comprising:
   a pseudo first-in first-out buffer for storing a copy of a first set of components for a packet when said packet is concurrently posted to said network transporter for testing, said first set of components being unique and descriptive of said packet and in an order of original sequence; and
   a comparator coupled to said pseudo first-in first-out buffer for comparing each said first set of components to a corresponding each said second set of components of said packet, said second set of components extracted from said packet once said packet has been processed by said network transporter and outputted by said network transporter, said first set of components in said pseudo first-in first-out buffer being reordered to correspond with the order in which said second set of components are extracted if each said second set of components are extracted in an order different from said original sequence.

7. The apparatus of claim 6 further comprising a packet poster on said host side coupled to said network transporter for writing said first set of components corresponding to said packet into said pseudo first-in first-out buffer and for posting said packet to said network transporter.

8. The apparatus of claim 7 further comprising a cell grabber on said physical side coupled to said network transporter for grabbing a cell from said network transporter corresponding to said packet posted by said packet poster on said host side until all cells for said packet are grabbed from said network transporter.

9. The apparatus of claim 8 further comprising a first comparator coupled to said cell grabber for comparing said first set of components with said second set of components for said packet, said second set of components being retrieved from said cells of said packet grabbed from said cell grabber and said first set of components being written into said pseudo first-in first-out buffer by said packet poster.

10. The apparatus of claim 9 further comprising a packet generator on said physical side coupled to said network transporter for generating said packet to be posted to said network transporter from said physical side and for writing said first set of components for said packet to said pseudo first-in first-out buffer.

11. The apparatus of claim 10 further comprising a packet grabber coupled to said network transporter on said host side for grabbing said packet posted to said network transporter by said packet generator on said physical side.

12. The apparatus of claim 11 further comprising a second comparator coupled to said packet grabber for retrieving said first set of components for said packet written into said pseudo first-in first-out buffer by said packet generator from said pseudo first-in first-out buffer and for comparing said first set of components with said second set of components from said packet grabbed from said network transporter by said packet grabber.

13. The apparatus of claim 6 wherein said comparator determines if said first set of components and said second set of components are equal.

14. A computer system for verifying a software simulated network transporter under test for transferring data between a host side and a physical side comprising:

a pseudo first-in first-out buffer for storing a first set of components for a packet which is concurrently posted to said network transporter, said first set of components being unique and descriptive of said packet and in an order of original sequence; and a comparator coupled to said pseudo first-in first-out buffer for comparing each said first set of components to a corresponding second set of components of said packet, each said second set of components extracted from said packet once said packet has been processed by said network transporter and outputted by said network transporter, said first set of components in said pseudo first-in first-out buffer being reordered to correspond with the order in which said second set of components are extracted if each said second set of components are extracted in an order different from said original sequence.

15. The system of claim 14 further comprising a packet poster on said host side coupled to said network transporter for writing said first set of components corresponding to said packet into said pseudo first-in first-out buffer and for posting said packet to said network transporter.

16. The system of claim 15 further comprising a cell grabber on said physical side coupled to said network transporter for grabbing a cell from said network transporter corresponding to said packet posted by said packet poster on said host side until all cells for said packet are grabbed from said network transporter.

17. The system of claim 16 further comprising a first comparator coupled to said cell grabber for comparing said first set of components with said second set of components for said packet, said second set of components being retrieved from said all cells of said packet grabbed from said cell grabber and said first set of components being written into said pseudo first-in first-out buffer by said packet poster.

18. The system of claim 17 further comprising a packet generator on said physical side coupled to said network transporter for generating said packet to be posted to said network transporter from said physical side and for writing said first set of components for said packet to said pseudo first-in first-out buffer.

19. The system of claim 18 further comprising a packet grabber coupled to said network transporter on said host side for grabbing said packet posted to said network transporter by said packet generator on said physical side.

20. The system of claim 19 further comprising a second comparator coupled to said packet grabber for retrieving said first set of components for said packet written into said pseudo first-in first-out buffer by said packet generator from said pseudo first-in first-out buffer and for comparing said first set of components with said second set of components from said packet grabbed from said network transporter by said packet grabber.

21. The system of claim 14 wherein said comparator determines a pass results for said comparing if said first set of components and said second set of components are equal.

* * * * *